United States Patent [19]

Edmonds, Jr. et al.

[11] 4,062,148

[45] Dec. 13, 1977

[54] BASKETS FOR RECEIVING TREE BALLS AND METHODS FOR USE THEREOF

[75] Inventors: William L. Edmonds, Jr., Kenilworth; Gerald P. Daley, Bensenville, both of Ill.; Leroy Den Besten, 1235 Rte. 9, Castleton, N.Y. 12033

[73] Assignee: Leroy Den Besten, Castleton, N.Y.

[21] Appl. No.: 619,651

[22] Filed: Oct. 6, 1975

[51] Int. Cl.² .............................................. A01C 11/00
[52] U.S. Cl. .............................................. 47/76; 47/78
[58] Field of Search ................... 47/37, 34, 58, 73, 74, 47/75, 76, 77, 78; 220/19; 217/122, 123; D9/247

[56] References Cited

U.S. PATENT DOCUMENTS

| D. 158,566 | 5/1950 | Engstrom | D9/247 |
|---|---|---|---|
| 1,129,011 | 2/1915 | Pyle | 220/19 |
| 2,818,681 | 1/1958 | Coplen | 47/37 X |
| 3,032,368 | 5/1962 | Sigler et al. | 47/37.1 |
| 3,316,675 | 5/1967 | Cartwright, Jr. | 47/37 |
| 3,550,318 | 12/1970 | Remke et al. | 47/37 |
| 3,550,662 | 12/1970 | Remke et al. | 47/37 X |
| 3,979,856 | 9/1976 | Belcher | 47/37 |

FOREIGN PATENT DOCUMENTS

| 956,910 | 4/1964 | United Kingdom | 220/19 |

OTHER PUBLICATIONS

*American Nurseryman,* 12/15/74, Remke Bag & Supply Co., AD on p. 23, vol. CXL, No. 12.
Advertisement p. 185 by Remke Bag & Supply Co. *American Nurseryman,* vol. CXXXIV, No. 2, July 15, 1971.
*Pacific Coast Nurseryman and Garden Supply Dealer,* "Vermeer Adds to Line" Col. 2, p. 58, July 1974, vol. 33, No. 7.
*American Nurseryman,* "Precut Disks Ease Winter Tree Balling Program," by Bill Wandell, pp. 11 and 65, July 15, 1974, vol. CXL, No. 2.

*Primary Examiner*—Clifford D. Crowder
*Assistant Examiner*—James R. Feyrer
*Attorney, Agent, or Firm*—Kane, Dalsimer, Kane, Sullivan and Kurucz

[57] ABSTRACT

Wire tree baskets are disclosed for receiving tree or shrub balls. The baskets are comprised of a plurality of spaced apart, circular wire rings of differing diameters in order to taper the basket at an angle of 28° to 32° and a plurality of wire upright loops terminated by bights to give tie-off points for securing the ball within the the basket. The basket is welded together with the welds located to reduce the possibility of fractured welds and, further, reduce both the damage to the structural integrity of the basket caused by the fracture of a weld and reduce the potential for damage to adjacent trees caused by the fracture of a weld when balled trees are stacked together. Advantageous methods for using the tree baskets are also disclosed.

14 Claims, 17 Drawing Figures

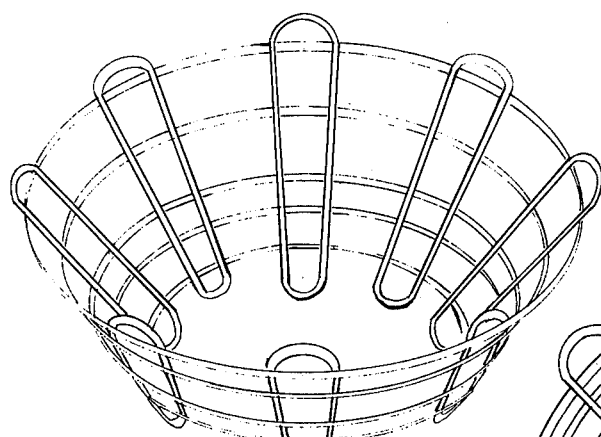
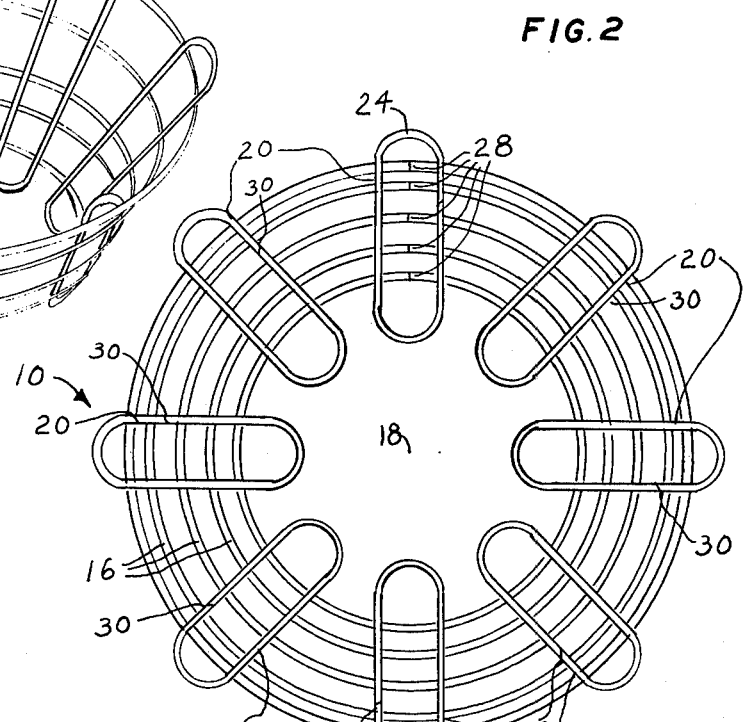
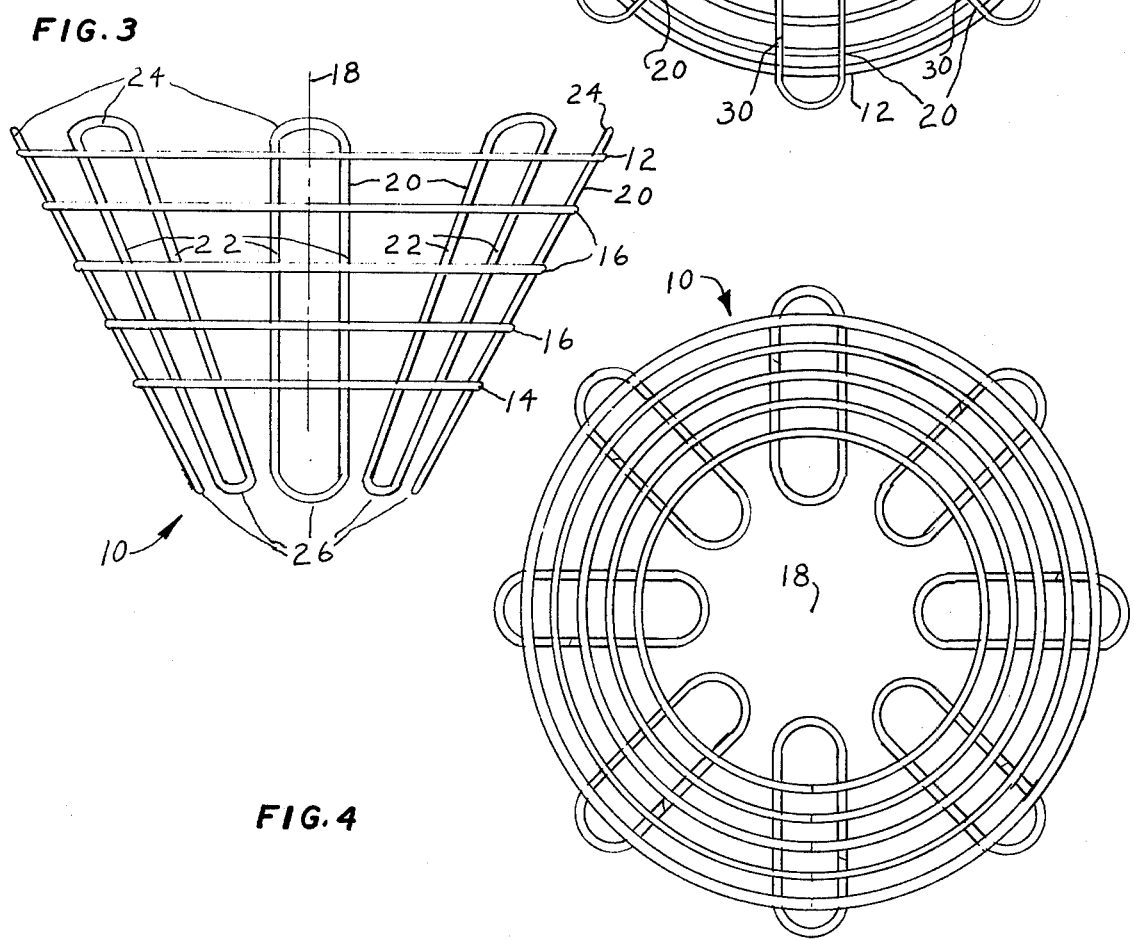
FIG. 1
FIG. 2
FIG. 3
FIG. 4

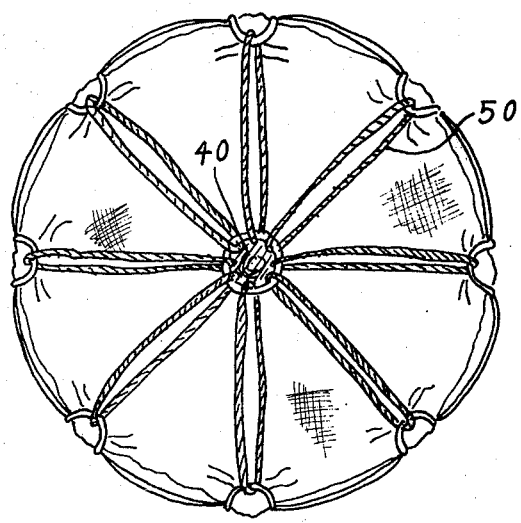
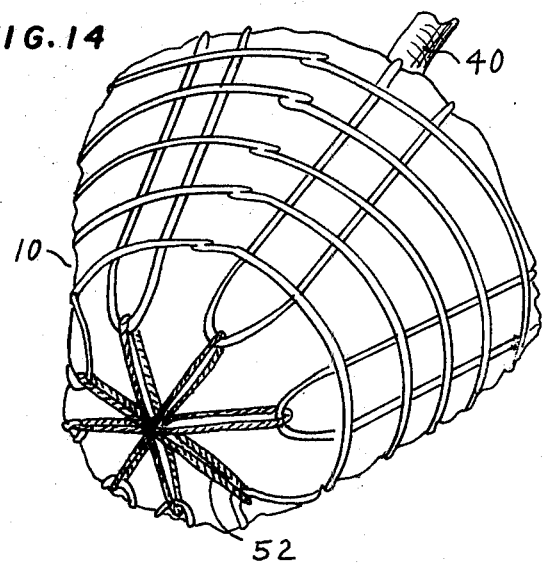
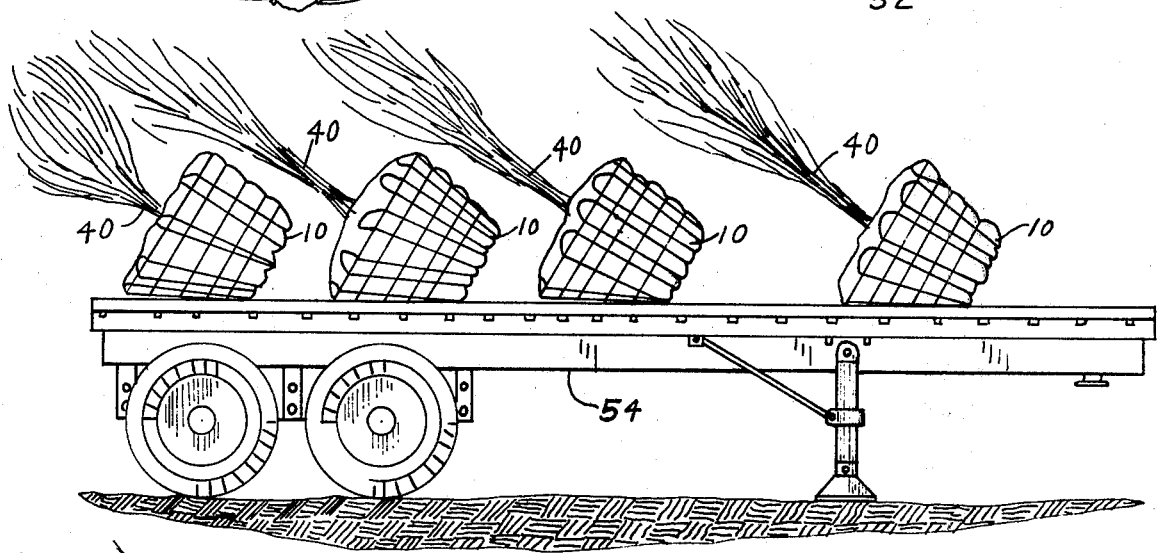
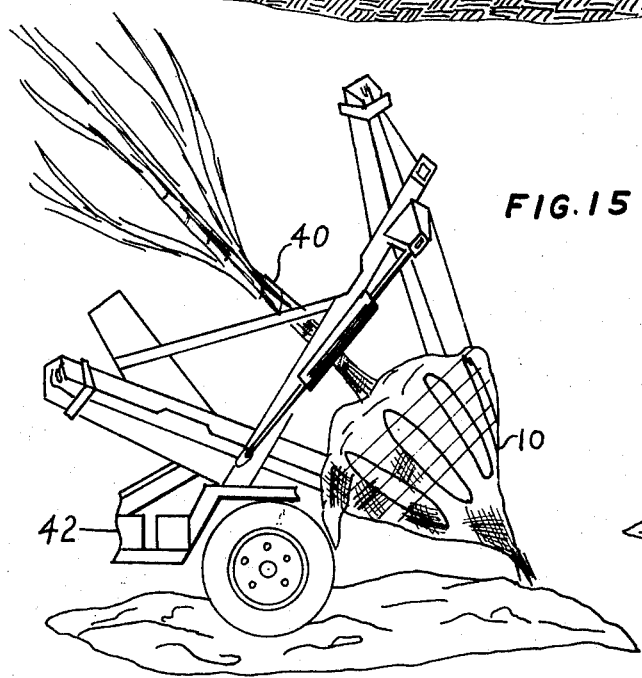
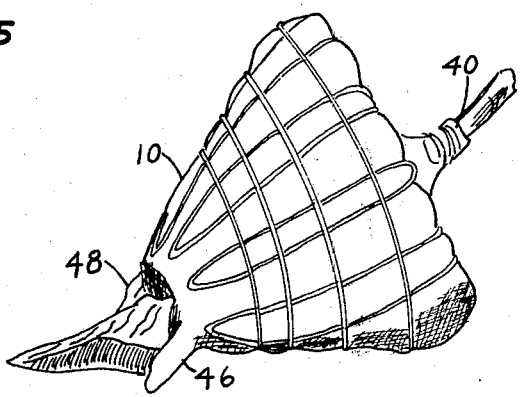

BASKETS FOR RECEIVING TREE BALLS AND METHODS FOR USE THEREOF

REFERENCE TO RELATED APPLICATION

This application is related to Design application Ser. No. D-532,717, filed Dec. 13, 1974, now U.S. Pat. No. Des. 237,814 granted Nov. 25, 1975.

BACKGROUND OF THE INVENTION

This invention relates to apparatus for receiving tree or shrub balls and methods for using such apparatus and, in particular, relates to wire baskets for receiving balled trees or shrubs and methods for using same. Hereinafter in both the specification and claims, the word "tree" shall be used to include both trees and shrubs.

Apparatus for balling trees for purposes of transplanting them are well known in the art and have come to be widely used in commercial nursery operations. Such apparatus generally comprise a plurality of spades which are positioned on the ground about the tree to be transplanted. The spades are extended down into the earth and toward the center of the tree until the spades meet. The spades are then simultaneously lifted out of the ground and contain within them a ball containing a portion of the tree's root structure with earth compacted thereabout, i.e., the tree ball, and the upper portion of the tree extending thereabove. Examples of such apparatus are disclosed in U.S. Pat. Nos. 3,364,601, 3,618,234, and 3,713,234.

As advantageous as the tree balling apparatus have become, there are still some disadvantages associated with their use. In particular, the development of containers suitable for receiving the tree ball has presented some problems. In the transplanting of a tree, it is most important that no cracks develop in the ball. The formation of such cracks tends to destroy the root structure of the tree and substantially reduces the probability that the transplanted tree can be successfully grown. Thus, it is necessary that a container for the tree ball maintain the integrity of the ball and, further, be such that the ball is not destroyed while being inserted into or removed from the container. It is further desirable that the container be such that excess dirt may be removed from the ball after it is placed therein, that the container be light so that transportation costs for both the containers themselves and the balled trees are minimized, and that the container be such that both the process of putting the tree ball therein and the process of replanting the tree may be done quickly and efficiently, and, of course, that the containers be relatively inexpensive.

A number of different tree ball containers have been used previously. Probably the simplest is a burlap or plastic film wrapper. This form of container did little by itself to prevent the development of cracks in the tree balls. Wooden buckets have also been used, but they are relatively heavy and expensive and the tree ball must be removed therefrom before the tree is replanted.

Wire baskets have also been used prior to the time of this invention. However, those wire baskets have had a number of disadvantages associated therewith. These wire baskets have generally been of welded construction but were such that if one of the welds should fracture, the structural integrity of the basket would be materially diminished. Further, the previous baskets have been such that when two or more trees are stacked together for storage or shipping, if one of the welds of the basket containing one of the trees should fracture, the probability of damage being done to an adjacent tree, i.e., one of the broken wires scraping through its bark, was unnecessarily high. The wire baskets known heretofore have not been shaped correctly to give the tree balls adequate support; this has lead to an unnecessarily high risk of damage to the ball during transport and while the ball was being inserted into the basket. Further, the previously known baskets have not provided adequate tie-off points for securing the basket to the tree or closing off the bottom of the basket. In particular, the prior baskets have been such that when any such tieing off was attempted, unnecessarily large stresses were placed upon the welds holding the basket together.

SUMMARY OF THE INVENTION

There is provided by this invention wire baskets for receiving tree balls comprised of a plurality of circular wire rings of differing diameters in order to taper the basket and a plurality of wire upright loops with bights at the upper and lower extremities to provide tie-off points. Desirably, the angle of taper of the basket is 28° to 32°. The welds required to form the rings are located within the upright loops and the welds required to form the upright loops are located between two rings. Further, the upright loops are welded to the individual rings. There is also provided by this invention methods for using wire tree baskets.

Thus, it is an object of this invention to provide containers for receiving tree balls.

It is an object of this invention to provide wire baskets for receiving tree balls.

It is an object of this invention to provide wire tree baskets adapted to give adequate support to the tree balls contained therein.

It is an object of this invention to provide wire tree baskets with tie-off points.

It is an object of this invention to provide wire tree baskets having a construction which will minimize breakage of the welds used to fasten the components thereof together.

It is an object of this invention to provide wire tree baskets having a construction which, in the event one of the welds used to fasten the components thereof together should fracture, the possibility of damage to adjacent trees is minimized.

It is an object of this invention to provide methods for using wire tree baskets which may be rapidly and efficiently carried out.

It is an object of this invention to provide wire tree baskets which are characterized by economy of construction and durability of use.

Various other objects of this invention will appear from this specification, the appended claims, and the drawing.

DESCRIPTION OF THE DRAWING

FIG. 1 is a perspective view of one of the tree baskets of this invention;

FIGS. 2-4 are plan, side, and bottom views, respectively, of the tree basket of FIG. 1;

FIGS. 5-14 are views illustrating a method for using a tree basket of this invention for trees in hard soil;

FIGS. 15 and 16 are views illustrating a method for using a tree basket of this invention for trees in sandy soil; and FIG. 17 is a view showing a plurality of trees in tree baskets of this invention stacked together.

DESCRIPTION OF THE PREFERRED EMBODIMENT

Figure 5:
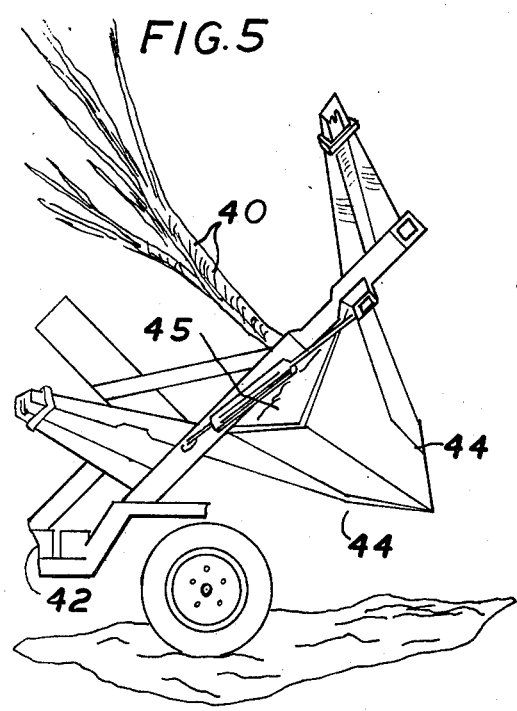
Figure 6:
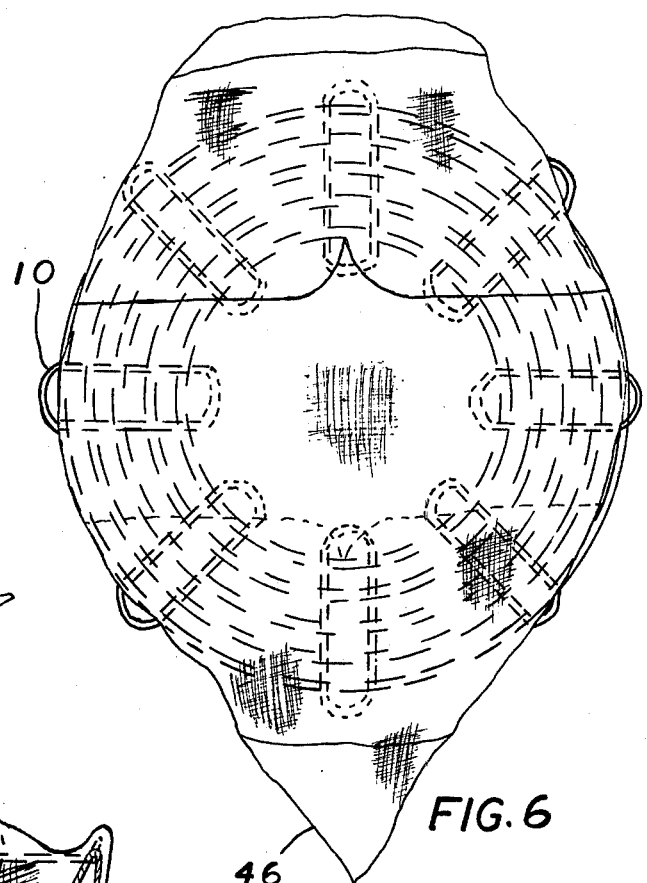
Figure 7:
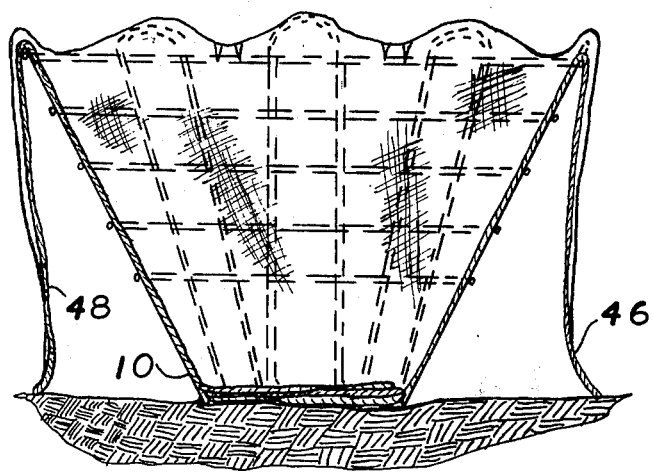
Figure 8:
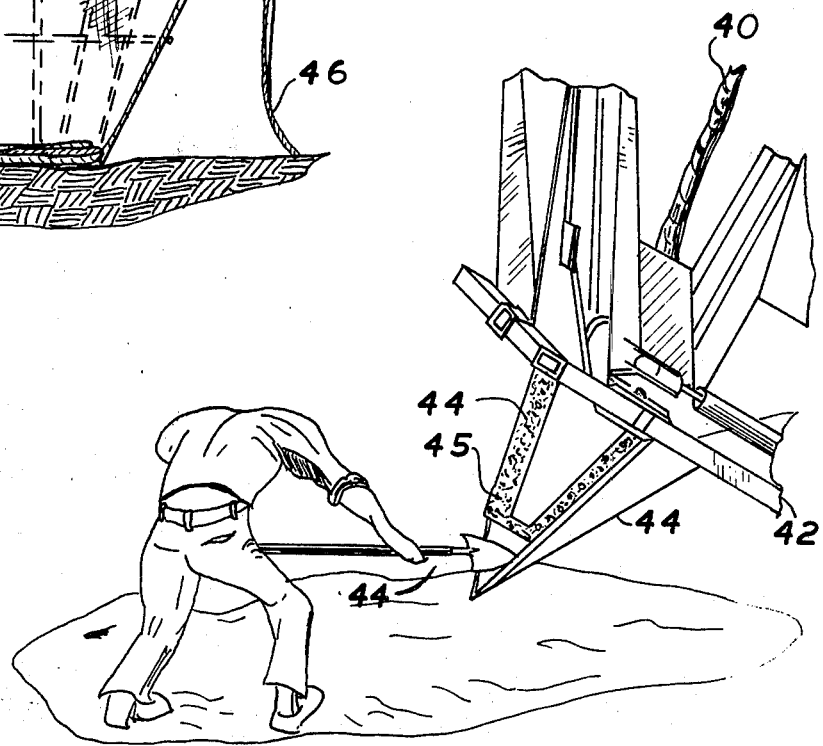

There are disclosed in FIGS. 1-4 one tree basket 10 of this invention. The tree basket 10 includes a plurality of spaced apart wire rings including an upper ring 12, a lower ring 14, and intermediate rings 16. The rings 12, 14, and 16 all have a circular configuration and the centers thereof lie on a straight line indicated at 18 which forms a central axis of the basket. Each of the rings 12, 14, and 16 is disposed perpendicularly to the axis 18. The basket 10 also includes a plurality of wire upright loops 20. Each loop 20 is closed and has two relatively straight side portions 22 and is terminated by an upper bight section 24 and a lower bight section 26. Each bight has a generally semi-circular configuration. In the basket shown, the upper bight section 24 of each loop is located entirely above upper ring 12 and the lower bight section 26 is located entirely below lower ring 14. Thus, the relatively straight side portions 22 of each of the loops 20 intersects each of the rings 12, 14, and 16 perpendicularly. The upright loops 20 are fastened to the rings 12, 14, and 16 by welding and are located within the rings.

It has been found advantageous to form each of the rings 12, 14, and 16 and upright loops 20 of galvanized steel wire. Each of the rings is formed by butt welding the ends of a piece of wire together to form a butt weld 28. Moreover, each of the upright loops 20 is formed by butt welding the ends of a piece of wire together to form a butt weld 30. In accord with a feature of this invention, when the basket 10 is assembled, the butt weld 28 used to form the upper ring 12 is located within one of the upright loops 20. Similarly, each butt weld 28 used to form each of the other rings is located within one of the upright loops 20. Although in the basket 10 shown in the drawing, all of the butt welds 28 are shown as being located within one of the upright loops, this is not necessarily always the case as the butt welds 28 could be located within different ones of the upright loops 20. Further, and also in accord with a feature of this invention, each of the butt welds 30 used to form the upright loops 20 is located between two of the rings 12, 14, and 16. Again, although in the basket 10 shown in the drawing, all of the butt welds 30 are shown as being located between the same two rings 16, this is not necessarily always the case as the butt welds 30 could be located between different ones of the rings 12, 14, and 16.

The location of the butt welds 28 and 30 as described insures that if one of those welds should fracture, a minimum of damage to the structural integrity of the basket will occur. For example, if one of the butt welds 28 forming the rings 12, 14, and 16 should fracture, the stress which would normally be transmitted through that weld will be transmitted through the relatively straight portions 22 of the loop 20 within which the fractured weld is located to the adjacent rings 12, 14, and/or 16. If one of the butt welds 30 forming the upright loops 20 should fracture, the upper and lower bights 24 and 26 will still be maintained. Moreover, locating the butt welds 28 and 30 as described insures that if one of those welds should fracture, the wire ends thus exposed will not be greatly displaced from its previous position. If the butt weld 28 forming one of the rings is fractured, the ends of the wire forming that ring will be maintained in approximately the same position since both ends are fastened to the loop 20 at positions relatively close to the extremities thereof. Similarly, if one of the butt welds 30 forming one of the upright loops is fractured, the ends of the wire forming that upright loop will be maintained in approximately the same position since both ends are each fastened to one of rings 12, 14, and/or 16 at positions relatively close to the extremities thereof. Maintaining the wire ends at approximately their same position after the fracture of a butt weld insures that the ends will not project from the basket excessively, thus minimizing the potential of a protruding wire damaging anything adjacent the basket, such as another tree.

As will be apparent, the rings 12, 14, and 16 of a single basket are all of different diameters, the upper ring 12 having the greatest diameter, the lower ring 14 having the smallest diameter, and the intermediate rings 16 having diameters intermediate those of rings 12 and 14. This results in the basket having the general shape of an inverted, truncated, right circular cone. In accord with this invention, it has been found advantageous to select the diameters of rings 12, 14, and 16 so that the basket 10 has an angle of taper in the range of approximately 28°-32°. The angle of taper is shown as angle $\theta$ in FIG. 3 and is the angle formed by the side portions 22 of the upright loops 20 and a line parallel to central axis 18. The preferred value of angle $\theta$ is 32°. So selecting the value for angle $\theta$ maximizes the usefulness of the basket 10 in retaining the tree balls formed by many commercially available tree ballers.

It is within the scope of this invention to provide tree baskets of differing size and including differing numbers of intermediate rings 16 and differing numbers of upright loops 20. The gauge of the wire from which the rings and upright loops are constructed may also be varied as a function of the basket size. A convenient way of describing the size of a tree basket is by giving the diameter of the upper ring 12. Tree baskets of 16, 24, 28, 32, 36, 40, and 60 inches have been found to be particularly useful in the practice of this invention. The smallest of these, i.e., the 16 inch basket, has no intermediate rings, has three upright loops, and is formed from 11 gauge galvanized steel wire, whereas the largest, i.e., the 60 inch basket has 6 intermediate rings, has 67 upright loops, and is formed from 5 gauge galvanized steel wire. The rings and the upright loops for any individual basket, of course, need not be of the same gauge wire. The following is a table giving the size of exemplary tree baskets constructed in accord with the invention, the number of intermediate rings, the gauge of the rings (including the upper, lower, and intermediate rings), the number of upright loops, the gauge of the upright loops, and the overall height of the basket measured along axis 18:

| Size | Number of Intermediate Rings | Gauge of Rings | Number of Upright Loops | Gauge of Upright Loops | Height |
|---|---|---|---|---|---|
| 16" | 0 | 11 | 3 | 11 | 10¼" |
| 24" | 1 | 10 | 6 | 10 | 15" |
| 28" | 2 | 10 | 6 | 10 | 18¾" |
| 32" | 2 | 10 | 8 | 9 | 19" |
| 36" | 3 | 10 | 8 | 9 | 23" |
| 40" | 3 | 10 | 8 | 9 | 26" |
| 60" | 6 | 5 | 6 | 5 | 37¼" |

In accord with a further feature of this invention, and as is shown in the drawing, the upright wire loops 20 and in particular, the relatively straight side portions 22 thereof extend substantially below the lower ring 14. As will be mentioned below, this feature insures that the tree ball will not be unintentionally damaged when it is placed with the tree basket 10.

As will be more fully explained subsequently, upper bights 24 and lower bights 26 provide tie-off points for securing the basket to the tree ball. As will be seen, by using bights 24 and 26 as the tie-off points, the stress generated when any lines or rope are fastened thereto will be generally transmitted between the bight sections 24 and 26 along the side portions 22. Thus, the welds which fasten the loop uprights 20 to the upper ring 12 and lower ring 14 will not be subject to undue stress. This would not be the case if the tree basket 10 were tied off directly to the upper and lower rings 12 and 14. The use of bights 24 and 26 as the tie-off points reduces the stresses applied to the welds holding the rings and the upright loops together, and reduces the probability of those welds fracturing.

There are disclosed in FIGS. 5–14 of the drawing an advantageous method of using the tree baskets 10 in accord with this invention. The method of FIGS. 5–14 is particularly advantageous when the tree to be transplanted is located in hard soil. It is believed that the method is fully disclosed in the drawing, so it will be only generally described here. In FIG. 5, a tree 40 to be transplanted is shown having already been removed from the ground by a tree balling apparatus 42. The apparatus 42 includes four spades 44 of which only two are visible in FIG. 5. The tree ball 45 comprising compacted dirt and the root structure of tree 40 is included within the spades 44. A tree basket 10 ready to receive tree 40 is shown in plan view in FIG. 6 and from the side in FIG. 7. Specifically, two square pieces of burlap material 46 and 48 are placed with the basket 10 so that all of the side surfaces of the basket are covered by the burlap pieces. The burlap pieces 46 and 48 overlap at the bottom of the tree basket. The burlap pieces 46 and 48 are secured to the basket 10 as by stapling.

In order to prepare the tree ball for insertion into the tree basket, two of the spades 44 of the apparatus 42 are withdrawn and the bottom of the ball manually removed as with a shovel 44. The bottom of the tree ball 45 is thus flattened off. During this operation, apparatus 42 should preferably maintain tree 40 at approximately a 45° angle from horizontal.

Figure 9:
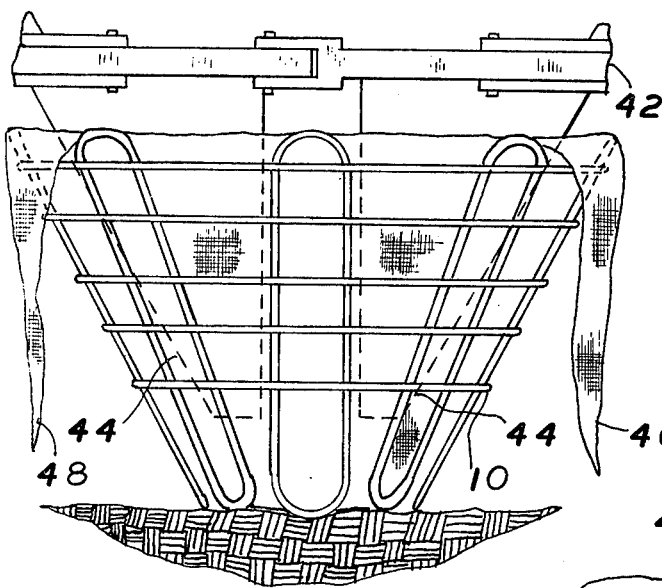

The tree balling apparatus 42 is then used to put the tree in a vertical orientation and lower the tree ball 45 into the basket 10 so that the apparatus is oriented as shown in FIG. 9. All of the spaces 44 in the apparatus 42 are then fully retracted and the apparatus 42 is removed. As shown in FIG. 9, the taper of the tree basket 10 is such that it conforms relatively closely to that of spades 44. Further, the upright loops 20 extend sufficiently below the lower ring 14 that the spades 44 may be fully inserted into the basket and engage the sides of the basket. Thus, when the spades 44 are withdrawn, there will be no excessive motion of the tree ball 45 as it settles into the basket. The pressure of such excess motion would otherwise tend to destroy the integrity of the tree ball and develop cracks therein.

Figure 10:
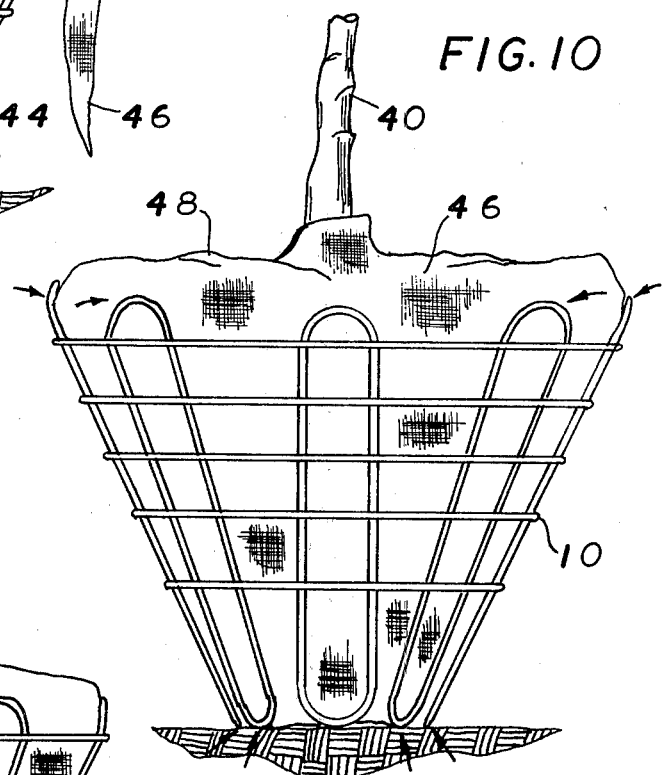
Figure 11:
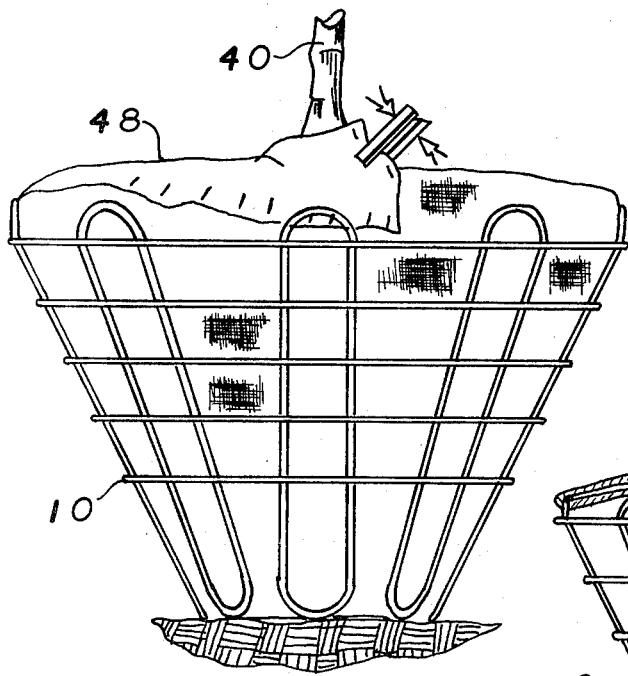
Figure 12:
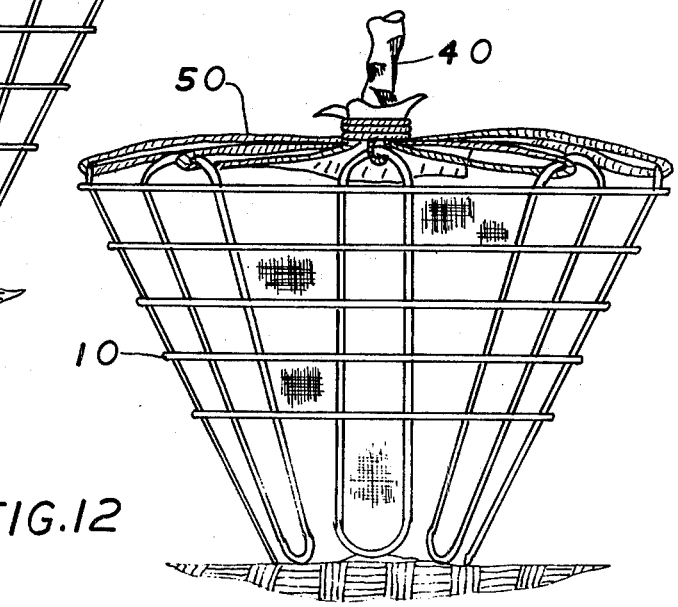

After apparatus 42 is removed, the upper portions of burlap pieces 46 and 48 may be brought up over the tree ball as shown in FIG. 10. The upper portions of burlap pieces 46 and 48 are then stapled about the trunk of tree 40 and the upper bights 24 may be bent inwards toward tree 40 to conform to the shape of the upper surface of tree ball 45. As is shown in FIGS. 12 and 13, a rope 50 is fastened to the trunk of tree 40 and snugly passed alternately through the upper bight portions 24 of the upright loops 20 and around the trunk of tree 40 until the trunk is tied to each of the bight sections 24 and the rope 50 is then tied off, thus securing the tree ball 45 within basket 10. The basket 10 and tree 40 are then tipped over onto the side of the basket and the oppositely disposed lower bight sections are tied together as by a rope 52 as is shown in FIG. 14. If desired, various ones of the rings 12, 14, and 16 and loops 20 may be crimped as shown in FIG. 14 in order to further tighten the tree basket 10 around the tree ball 45. This completes the operation of placing tree ball 45 within tree basket 10.

There is disclosed in FIGS. 15 and 16 of the drawing steps in a method for using the tree basket of this invention when the tree 40 is located in very soft or sandy soil. In this method, the tree 40 is again removed from the ground by tree balling apparatus 42 and burlap pieces 46 and 48 are placed within the basket 10 as previously described. However, in this situation, if one or more of the spades 44 were partially retracted to form the bottom of the ball, the soil included within the tree ball 45 would have a tendency to fall out from between the spades. Thus, with soft or sandy soil, all the spades 44 are left in their fully extended position and while the tree is at an angle of approximately 45 degrees to the horizontal, the basket 10 is manually placed up around the spades 44 as shown in FIG. 15. The basket may be held in place by strapping it to the tree balling apparatus 42. The tree 40 and tree basket 10 are then lowered to the ground, the spades 44 retracted out of the basket, the tree balling apparatus 42 unstrapped from the tree basket and removed, and the top of the basket fastened to the trunk of tree 40 as previously described with reference to FIGS. 10–13. Following this, the tree 40 and tree basket 10 are tipped over and the bottom portions of burlap pieces 46 and 48 are separated. Soil may then be removed from the bottom of tree basket 10 and the bottom of tree ball 45 appropriately formed. Finally, the bottom of the basket 10 is closed off as shown in FIG. 14.

In FIG. 17 there is shown a plurality of trees 10 within a corresponding plurality of tree baskets 10 stacked together on a trailer 54 for shipping. It will be apparent that the trees 40 are resting upon adjacent tree baskets 10. It is readily seen that if a tree basket were used which caused a wire end to extend therefrom when one of the welds fastening it together fractured, that extending wire could easily engage the trunk of adjacent trees thus scarring its bark or doing other damage thereto. However, as mentioned previously, the structure of tree basket 10 disclosed herein minimizes the possibility of any wire ends extending therefrom and, thus, also minimizes the possibility of doing damage to an adjacent tree.

It will thus be seen that a tree basket has been provided by this invention which fulfills each of the above-mentioned objects and, additionally, methods for using tree baskets have been provided which may be rapidly and efficiently carried out. While a particular tree basket of this invention and two particular methods of use thereof have been disclosed, it is to be understood, of course, that the invention is not to be limited thereto, since many modifications may be made. It is contemplated, therefore, by the appended claims, to cover any such modifications as fall within the true spirit and scope of this invention.

We claim:

1. A wire basket for receiving tree balls and comprising:
   a plurality of vertically spaced apart, circular closed wire rings arranged substantially horizontally, the diameter of each of said wire rings being different from the diameter of each other of said wire rings, the diameters and spacing of the wire rings being selected so that the wire tree basket has an angle of taper; and
   a plurality of vertically extending oblong wire upright loops connected by welds to the spaced apart horizontal rings and maintaining the wire rings in the spaced apart relationship, said wire upright loops being terminated by an integral upper bight section and an integral lower bight section with a portion of said upper bight section being located above the uppermost of said wire rings and a portion of said lower bight section being located below the lowermost of said wire rings to form tie-off points, said wire upright loops comprising substantially parallel side portions disposed between said upper bight section and said lower bight section, said relatively straight side portions engaging each of said wire rings approximately vertically, said relatively straight side portions being welded to said wire rings, the bight sections cooperating in securing the basket about the tree ball and the wire of the basket being distortable to deform the wire at selected locations for tightening the embracing relationship of the wire basket about the tree ball to thereby cooperate and maintain the integrity of the ball and contained root structure between excavation and transplanting.

2. The wire tree basket of claim 1 wherein each of said wire rings includes a weld and the welds of said wire rings are located within said wire upright loops.

3. The wire tree basket of claim 1 wherein each of said wire upright loops includes a weld and the welds of said wire upright loops are located between two of said wire rings.

4. The wire tree basket of claim 1 wherein the diameters and spacings of said wire rings are selected so that said wire tree basket has an angle of taper in the range of 28° to 32°.

5. The wire tree basket of claim 1 wherein said upright wire loops extend substantially below the lowermost of said wire rings.

6. A wire basket for receiving tree balls and comprising:
   a plurality of vertically spaced apart, circular closed wire rings arranged substantially horizontally, the diameter of each of said rings being different from the diameter of each other of said wire rings and the diameters and spacings of said wire rings being selected so that said wire tree basket has an angle of taper and each ring including a weld; and
   a plurality of vertically extending oblong wire upright loops connected by welds to the spaced apart horizontal rings in the spaced apart relationship, said wire upright loops being comprised of relatively straight parallel side portions, an upper integral bight section above the upper ring, an integral lower bight section below the lower ring, and a weld, and said relatively straight side portions and said wire rings being welded together so that the welds of said wire rings are located within said wire upright loops, and the welds of said wire upright loops are located between two of said wire rings, and said wire upright loops extend substantially below the lowermost of said wire rings, said wire upright loops comprising relatively straight side portions disposed between said upper bight section and said lower bight section, said relatively straight parallel side portions engaging each of said wire rings approximately perpendicularly, said relatively straight parallel side portions being welded to said wire rings, the bight sections cooperating in securing the basket about the tree ball and the wire of the basket being distortable to deform the wire at selected locations for tightening the embracing relationship of the wire basket about the tree ball to thereby cooperate and maintain the integrity of the ball and contained root structure between excavation and transplanting.

7. The invention in accordance with claim 6, wherein at least one piece of burlap is disposed interiorly of the basket.

8. The invention in accordance with claim 7, wherein the basket with interiorly disposed burlap is disposed about a ball of earth having an embedded root structure of a plant to be transplanted.

9. A method of balling root structures of trees, bushes, plants, etc. embedded in a ball of earth comprising:
   placing the ball of earth containing the root structure in a wire basket having a network of wire for embracing the outer periphery of the ball of earth with the embedded root structure, the network having an upper end and a lower end, and extension members at the top and bottom ends of the network for cooperating in receiving lacing for securing the basket about the ball of earth, the network of wire including a plurality of vertically spaced horizontal circular wires and a plurality of vertically extending oblong wires with substantially parallel portions welded to the circular wires and which maintain the circular wires in the vertically spaced relationship and which include integral hoops extending respectively beyond the uppermost and lowermost circular wires and said hoops defining said extension members for receiving the lacing, the wire of the network being distortable for tightening the embracing relationship of the wire basket about the ball of earth, the extension members being then bent inwardly;
   lacing the extension members about the ball of earth with contained root structure for maintaining the integrity of the earth ball between excavation and transplanting; and
   deforming the wire at selected locations to tighten the wire basket about the ball of the tree to thereby cooperate and maintain the integrity of the ball and contained root structure between excavation and transplanting.

10. The invention in accordance with claim 9, wherein the ball of earth is removed from the ground by a digging machine and maintains such ball in an elevated position, and the basket is placed about the ball in this elevated position and biased there against by interconnecting means between the basket and the chassis of the digging machine.

11. The invention in accordance with claim 10, wherein initially inserting two essentially square pieces of burlap into the basket with one corner of each piece facing downwardly and connecting the overlapping side edges of the burlap pieces together and to the wire of the basket and thereafter placing the basket with interiorly contained burlap pieces about the ball of earth.

12. The invention in accordance with claim 11, wherein the bottom of the ball is trimmed and the burlap is wrapped over the trimmed bottom of the ball while the ball and embracing basket are on the digging machine.

13. The invention in accordance with claim 11, wherein the ball and burlap lined basket associated therewith is lowered to the ground by the digging machine and disassociating the digging machine from the lowered earth and associated lined basket.

14. The invention in accordance with claim 13, wherein the bottom of the ball is trimmed to provide a ball of described depth, the burlap is wrapped about the trimmed bottom and the overlapping edges of the burlap are connected together and the extension members at the bottom of the basket are bent radially inwardly and thereafter laced together.

* * * * *